United States Patent
Bourniche et al.

(10) Patent No.: US 11,319,843 B2
(45) Date of Patent: May 3, 2022

(54) CONTROL SCREW

(71) Applicant: DELPHI AUTOMOTIVE SYSTEMS LUXEMBOURG SA, Bascharage (LU)

(72) Inventors: Eric Bourniche, Preutin-Higny (FR); Marc Cipriano, Russage (FR); Lucas Giambrone, Haucourt-Moulaine (FR)

(73) Assignee: Delphi Automotive Systems Luxembourg SA, Luxembourg (LU)

( * ) Notice: Subject to any disclaimer, the term of this patent is extended or adjusted under 35 U.S.C. 154(b) by 0 days.

(21) Appl. No.: 16/976,804

(22) PCT Filed: Feb. 28, 2019

(86) PCT No.: PCT/EP2019/055053
§ 371 (c)(1),
(2) Date: Aug. 31, 2020

(87) PCT Pub. No.: WO2019/170524
PCT Pub. Date: Sep. 12, 2019

(65) Prior Publication Data
US 2020/0408114 A1    Dec. 31, 2020

(30) Foreign Application Priority Data
Mar. 7, 2018  (FR) ...................................... 1851963

(51) Int. Cl.
*F01L 1/34*   (2006.01)
*F01L 1/344*  (2006.01)
*F01L 1/047*  (2006.01)

(52) U.S. Cl.
CPC ......... *F01L 1/3442* (2013.01); *F01L 1/34409* (2013.01); *F01L 1/047* (2013.01); *F01L 2001/34443* (2013.01); *F01L 2001/34483* (2013.01); *F01L 2250/02* (2013.01)

(58) Field of Classification Search
CPC ..... F01L 1/3442; F01L 1/34409; F01L 1/047; F01L 2001/34443; F01L 2001/34483; F01L 2001/34426; F01L 2250/02; F16K 11/0716; F16K 15/185
See application file for complete search history.

(56) References Cited

U.S. PATENT DOCUMENTS

| | | | |
|---|---|---|---|
| 10,358,953 B2 * | 7/2019 | Leblay | ................ F01L 1/3442 |
| 2010/0243085 A1 | 9/2010 | Van Weelden et al. | |
| 2016/0201822 A1 | 7/2016 | Takada | |
| 2018/0016950 A1 | 1/2018 | Haltiner, Jr. | |
| 2018/0355766 A1 | 12/2018 | Leblay et al. | |

* cited by examiner

*Primary Examiner* — Zelalem Eshete
(74) *Attorney, Agent, or Firm* — Joshua M. Haines

(57) ABSTRACT

A control screw for a camshaft phase shifter of an internal combustion engine extends along a longitudinal axis. The control screw includes a screw body. The control screw also includes a tubular spool assembly having a control valve assembly with at least three rigid rings and at least two valves. Each valve includes at least one vane connected to two flexible arms. The valve is connected to two consecutive rigid rings.

1 Claim, 3 Drawing Sheets

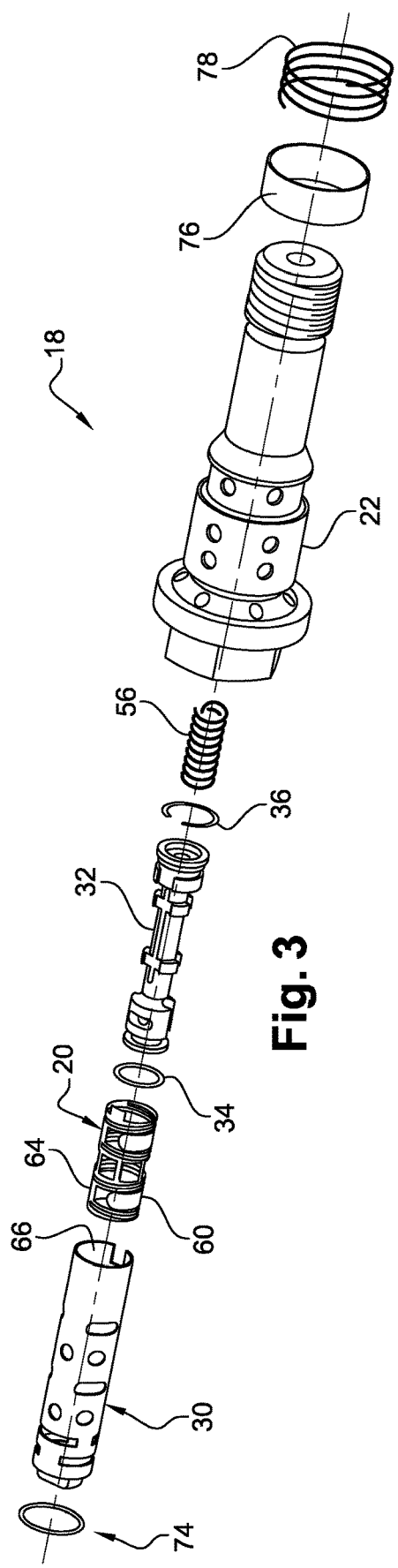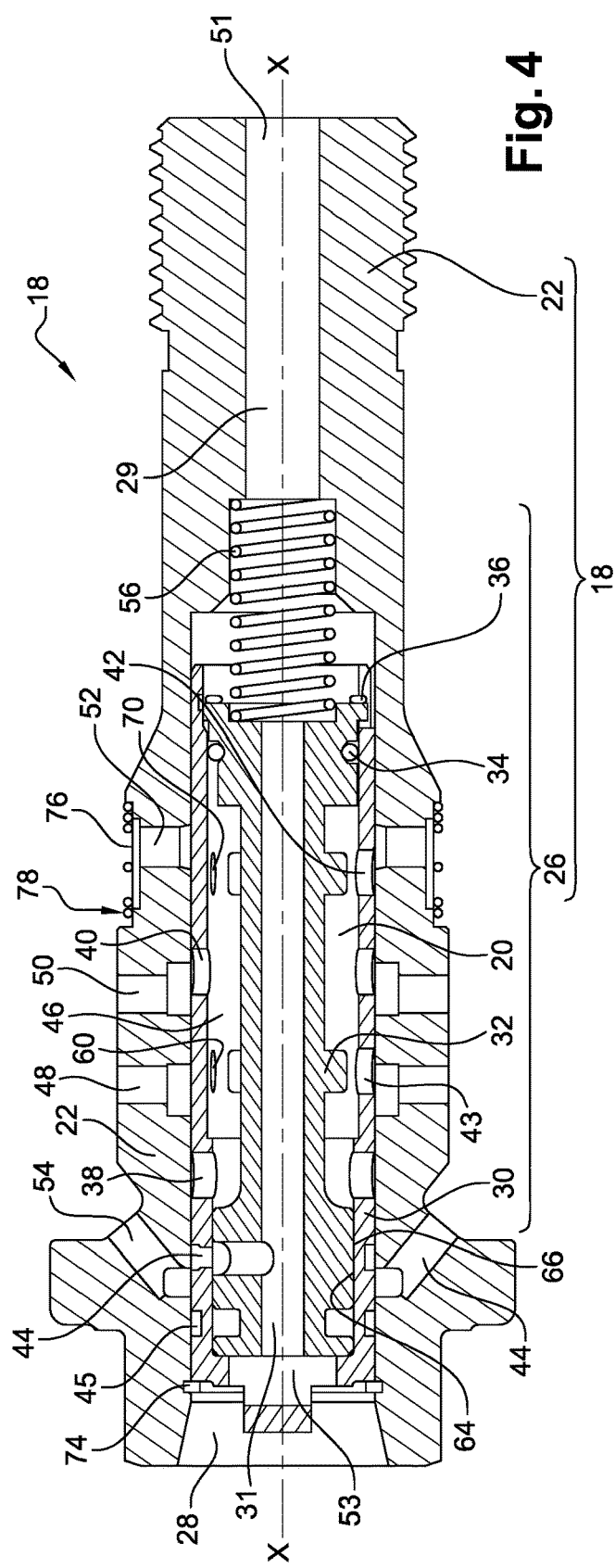

CONTROL SCREW

CROSS REFERENCE TO RELATED APPLICATIONS

This application is a national stage application under 35 USC 371 of PCT Application No. PCT/EP2019/055053 having an international filing date of Feb. 28, 2019, which is designated in the United States and which claimed the benefit of FR Patent Application No. 1851963 filed on Mar. 7, 2018, the entire disclosures of each are hereby incorporated by reference in their entirety.

TECHNICAL FIELD

The present invention relates to a control screw arranged in a camshaft phaser for an internal combustion engine.

TECHNOLOGICAL BACKGROUND OF THE INVENTION

Camshaft phasers are used to control the angular relationship between the crankshaft pulley and the camshaft of an internal combustion engine. In a double head camshaft engine, a camshaft phaser is used to alter the phasing of the intake camshaft in order to broaden the engine torque curve, increase the power at variable high speed and improve the idling quality. Furthermore, the exhaust cam may have its timing varied by a camshaft phaser in order to allow control of the internal EGR (exhaust gas recirculation) valve, thereby considerably reducing the emissions of pollutant substances and also allowing better fuel economy.

By rotating the camshafts toward advance or retard positions, the angular timing of the valve lift is modified. Camshaft phasers are controlled by hydraulic systems which use the lubricating oil pressurized by the oil pump.

In order to allow the camshaft to rotate, the camshaft phaser is made up of a stator part connected to the crankshaft via a chain or a belt, and of a rotor part fixed to the camshaft.

One or more pairs of hydraulic chambers are positioned between the rotor and the stator to constitute a rotary actuator. Each pair of hydraulic chambers is made of an advance chamber and of a retard chamber.

There are two distinct technologies that allow the rotational movement of the rotor relative to the stator.

The first technology consists in using the difference in pressure between the pressurized oil coming from the oil pump and the engine drain pressure close to atmospheric pressure. Thus, when the pressure in the advance chamber is higher than the pressure in the retard chamber, the rotor turns in the advance direction and likewise when the pressure in the retard chamber is higher than the pressure in the advance chamber, the rotor turns in the retard direction. The direction of rotation is controlled by a 4-port three-position solenoid valve. The volume of oil used for moving the rotor is taken from the high-pressure circuit and removed via a drain, leading to consumption of hydraulic power.

The second technology consists in using the fluctuations of torque applied to the camshaft and which result from the forces of compressing the valve springs. These fluctuations are transferred to the rotor, generating a difference in pressure across each pair of advance and retard chambers. Each pair of chambers is hydraulically connected by a duct containing a valve that allows oil to circulate in one direction. The rotation of the rotor is in just one direction. The direction of rotation, advance or retard, is selected by a 5-port three-position solenoid valve. A valve is incorporated into a slide valve assembly of the solenoid valve. The rotation is in the advance direction or in the retard direction according to the position of the slide valve assembly. The volume of oil displaced during the movement of the rotor is transferred between the advance chamber and the retard chamber. There is recirculation of oil within the phaser and therefore no hydraulic power is consumed. An oil supply is needed via the circuit of pressurized oil coming from the oil pump. In order not to discharge the internal pressure of the camshaft phaser to the engine oil circuit and therefore in order not to disrupt that circuit, a second valve is used at the inlet of the control solenoid valve. The valves used at the present time are of the ball or spring type and need to have a permeability/size ratio that is compatible with the expected performance of the camshaft phaser, and this is something that is difficult to obtain. The difficulty lies in the search for a compromise between a small size of the camshaft phaser and its rotational speed.

In that context, the object of the invention is to solve at least one of the problems associated with the known valves.

SUMMARY OF THE INVENTION

The present invention solves the abovementioned problems by proposing a control screw for a camshaft phaser of an internal combustion engine. The control screw extends along a longitudinal axis and comprises a screw body, a tubular slide valve assembly comprising a control valve assembly having at least three rigid rings and at least two valves. Each valve comprises at least one blade connected to two flexible arms, and in that the valve is connected to two consecutive rigid rings. In addition, the control valves assembly additionally comprises an indexing element provided with an internal or external notch. A method for producing the control valves assembly as described hereinabove comprises the following steps:
 a) taking a metal tube,
 b) laser cutting the metal tube.

Another method for producing the control valves assembly as described hereinabove is now described and comprises the following steps:
 a1) taking a sheet of metal,
 b1) cutting the metal sheet by stamping,
 c1) rolling the metal sheet,
 d1) welding the sheet that has been rolled on the longitudinal axis.

In addition, a method for assembling the control screw as described hereinabove comprises the following steps:
 a2) taking a control valve assembly, a slide valve insert, an O ring, a crinkle retaining ring, a screw body and a spring, a retaining ring and a filter,
 b2) inserting the O ring into a groove of the slide valve insert,
 c2) inserting the control valve assembly into the slide valve body using a device that employs vacuum so as to guarantee the integrity of the control valve assembly by keeping the blades away from the longitudinal axis,
 d2) inserting the assembly consisting of the slide valve insert and of the O ring into the assembly consisting of the slide valve body and of the control valve assembly,
 e2) inserting the crinkle retaining ring into the groove of the slide valve body,
 f2) inserting the spring into the screw body,
 g2) inserting the slide valve assembly into the screw body and inserting the retaining ring,
 h2) winding the filter around the screw body,
 i2) fitting a filter clip around the filter.

BRIEF DESCRIPTION OF THE DRAWINGS

One or more embodiments of the invention will now be described, purely by way of example, with reference to the attached drawings, in which:

FIG. 3 is an exploded view of the control screw according to the invention;

FIG. 4 is a view in section of the control screw according to the invention;

DESCRIPTION OF THE PREFERRED EMBODIMENTS

Figure 1:
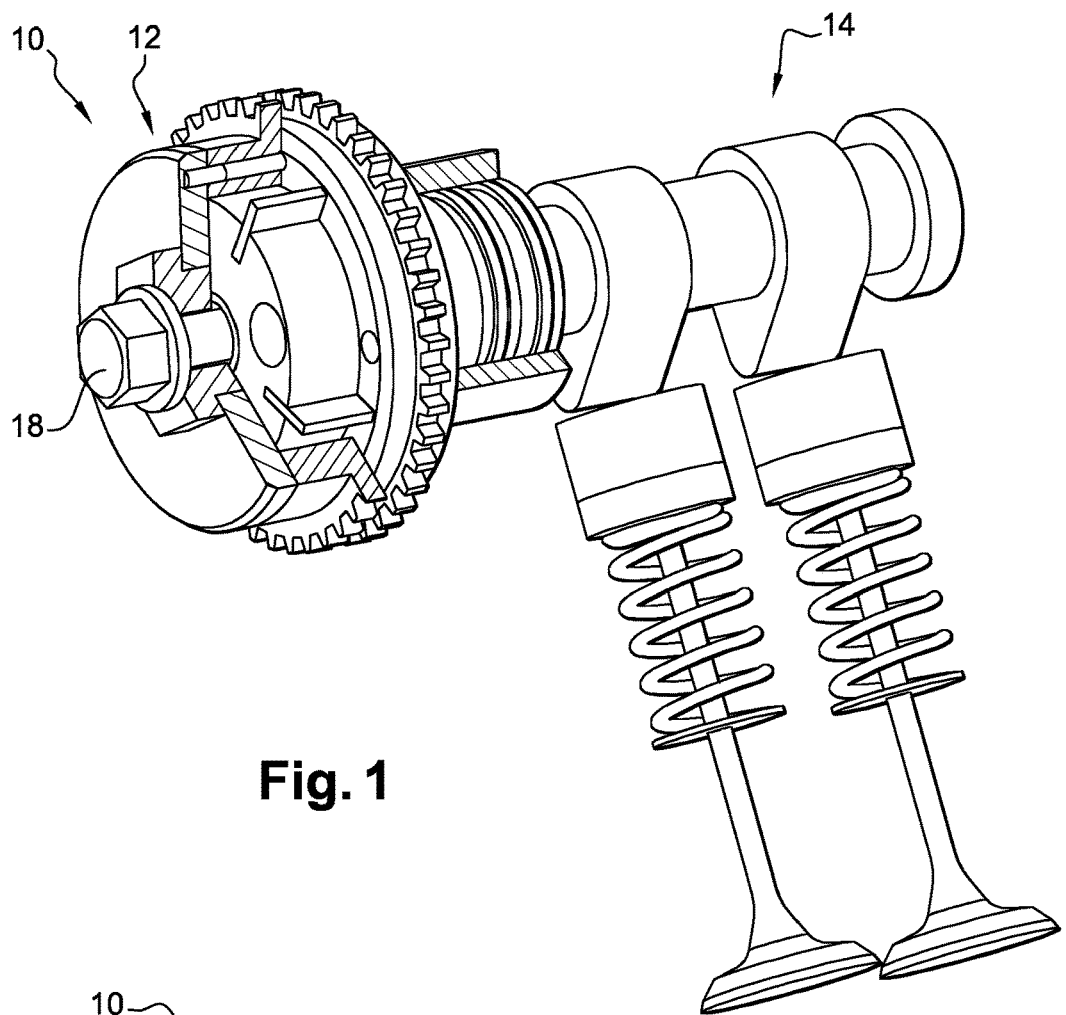
FIG. 1 is a perspective view of a camshaft phaser assembly.
Figure 2:
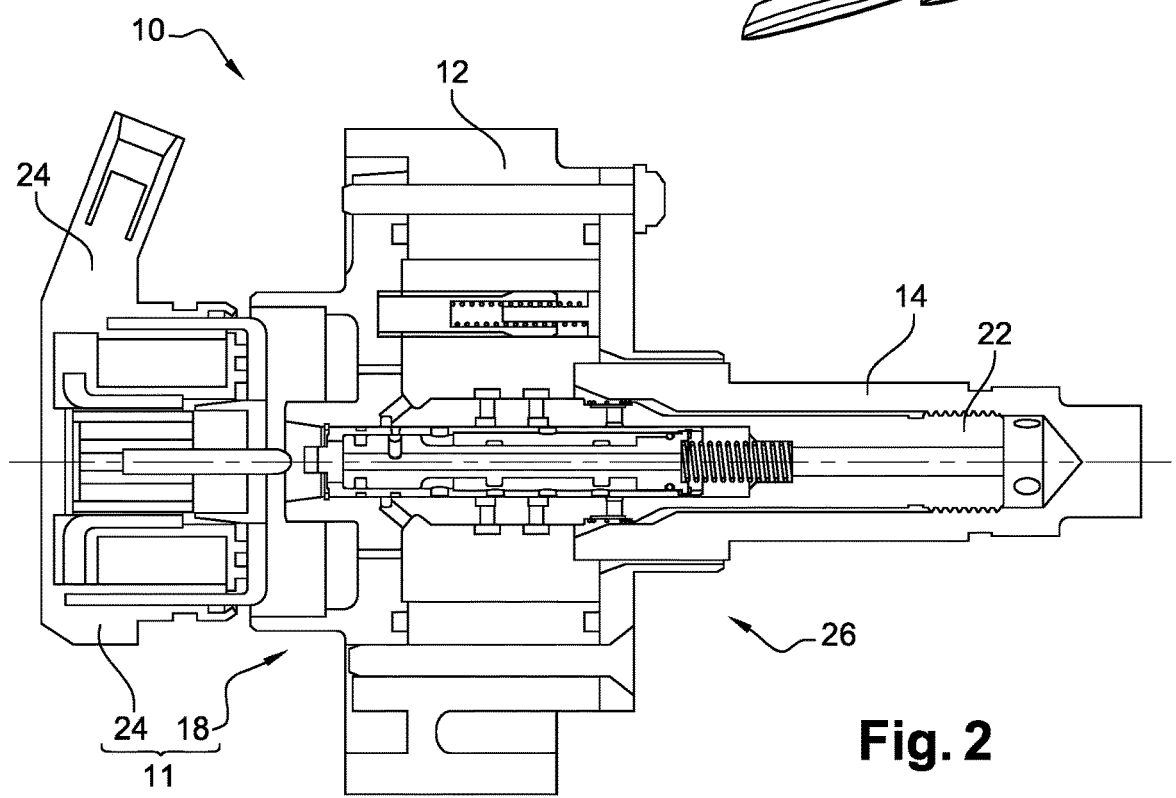
FIG. 2 is a view in section of an actuator, of a phaser and of a control screw according to the invention.

FIGS. 1 and 2 depict a camshaft phaser assembly 10 comprising an actuator 24 and a camshaft phaser 12 fixed to a camshaft 14 via a control screw 18. Inside the camshaft phaser 12 there are one or more pairs of chambers. The pairs of chambers comprise an advance chamber and a retard chamber (which are not depicted). The actuator 24 and the control screw 18 form a solenoid valve system 11.

According to FIGS. 1 and 2, a slide valve assembly 26 is mounted in a screw body 22 and controls a flow of fluid between the advance and retard chambers of the camshaft phaser 12 in order to cause the camshaft phaser assembly 10 to rotate in the advance or retard directions. The slide valve assembly 26 and the screw body 22 form a control screw 18.

FIG. 2 depicts the actuator 24, the control screw 18 and a camshaft phaser 12. The actuator 24 is mounted in a housing formed in a crankcase (not depicted). The camshaft phaser 12 is fixed by the screw body 22 to the camshaft 14. The slide valve assembly 26 is arranged in a complementary fashion inside the screw body 22.

FIGS. 3 and 4 depict the control screw 18. The control screw 18 extends along a longitudinal and central axis X. The control screw 18 is cylindrical in shape. The screw body 22 comprises an internal cavity 28 and a bore 29. The screw body 22 is cylindrical in shape. The slide valve assembly 26 comprises a slide valve body 30, a slide valve insert 32, a control valves assembly 20, an O ring 34, a crinkle retaining ring 36. The slide valve assembly 26 delimits an internal chamber 46 in which the prevailing pressure is the recirculation pressure of the control screw 18.

The term "at least one opening", which will be used hereinafter in the description, defines a number of openings comprising at least one opening.

FIG. 4 depicts an example of a control screw 18 comprising the screw body 22 having four ports 48, 50, 52, 54 arranged radially and a drain port 51, 53, making it five ports. The port 48 is also referred to as the advance port 48. The port 50 is referred to as the retard port 50. The port 52 is referred to as the supply port 52. The port 54 is also referred to as the locking port 54. The screw body 22 additionally comprises two drain ports 51, 53. The drain ports 51, 53 communicate with one another and form a single hydraulic port. The drain port 51 is also referred to as the rear drain port 51. The drain port 53 is also referred to as the front drain port 53.

In FIG. 4, the supply port 52 is provided with a filter 76. The supply port 52 is provided with at least one opening connected to the pressurized oil circuit of the engine (not depicted). The advance port 48 is provided at minimum with an opening connected to the advance chambers of the rotor (chambers are not depicted). The retard port 50 is provided with at least one opening connected to the retard chambers of the rotor (not depicted). The locking port 54 is provided with at least one opening connected to the locking duct of the rotor (not depicted). The rear drain port 51 is provided with at least one opening connected to the engine drain (not depicted).

FIG. 4 depicts the slide valve body 30 comprising openings 38, 40, 42, 43, 44, 45. The openings 38, 40, 42, 43, 44, 45 are arranged radially all around the slide valve body 30. The opening 38 is also referred to as the advance opening 38. The opening 40 is also referred to as the retard opening 40. The opening 42 is also referred to as the supply opening 42. The opening 43 is also referred to as the recirculation opening 43. The opening 44 is also referred to as the locking opening 44. The opening 45 is also referred to as the unlocking opening 45. The slide valve body 30 comprises at least the advance opening 38, at least the retard opening 40, at least the supply opening 42, at least the recirculation opening 43, at least the locking opening 44, at least the unlocking opening 45. The openings 38, 40, 45 are subjected to the recirculation pressure via the internal chamber 46. The locking opening 44 is subjected to the drain pressure.

According to FIG. 4, the slide valve assembly 26 is pivot-connected with the ability to slide along the longitudinal axis X in the bore 29 of the screw body. The oil supply openings 42 communicate with the supply port 52 whatever the position of the slide valve assembly 26 along the longitudinal axis X. The recirculation openings 43 communicate with the advance port 48 or with the retard port 50 according to the position of the slide valve assembly 26 along the longitudinal axis X. The advance openings 38 communicate or do not communicate with the advance port 48 according to the position of the slide valve assembly 26 along the longitudinal axis X. The retard openings 40 communicate or do not communicate with the retard port 50 according to the position of the slide valve assembly 26 along the longitudinal axis X. The locking openings 44 communicate or do not communicate with the locking port 54 according to the position of the slide valve assembly 26 along the longitudinal axis X. The unlocking openings 45 communicate or do not communicate with the locking port 54 according to the position of the slide valve assembly 26 along the longitudinal axis X.

FIG. 4 depicts the recirculation 43 and supply 42 openings of the slide valve body. The recirculation 43 and supply 42 openings are elongate in a circumferential direction perpendicular to the longitudinal axis X. In this way, the recirculation 43 and supply 42 openings of the slide valve body each have an oblong projected cross section. This oblong cross section allows for a larger area for flow than does a circular opening for the same width along the axis X, and therefore allows for a larger throughput of fluid through the advance 48, retard 50 and supply 52 ports.

According to FIG. 4, the recirculation openings 43 and the oil supply openings 42 are positioned facing the blades 60 of the control valves assembly 20. The control valves assembly 20 is arranged in a bore 31 of the slide valve body so that the exterior surface 64 of the control valves assembly 20 is in contact with the interior surface 66 of the slide valve body 30.

Figure 5:
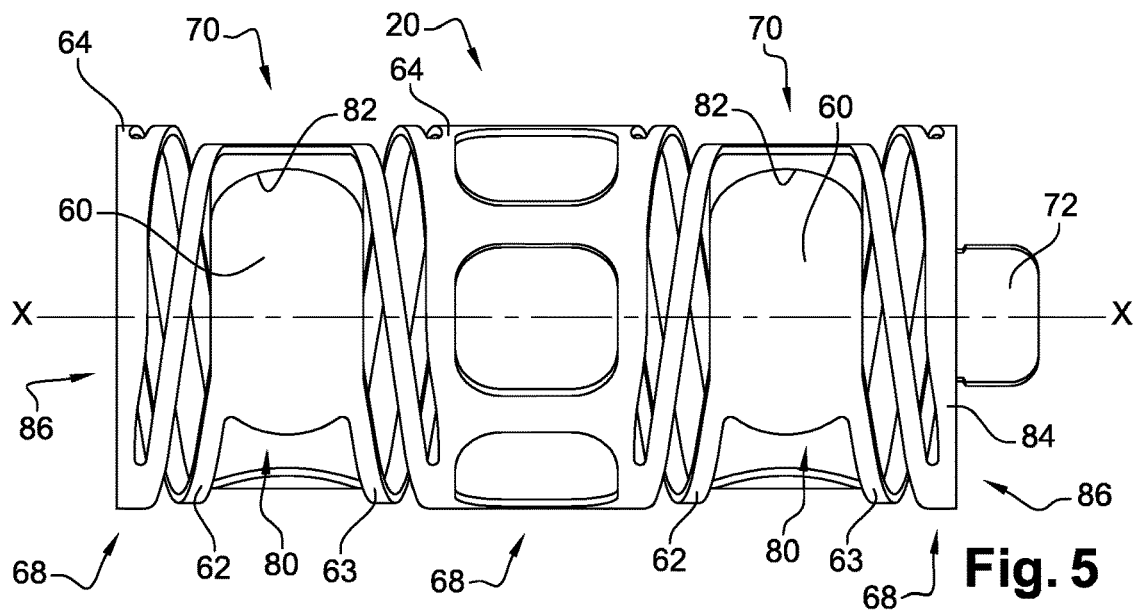
FIGS. 5, 6 and 7 are, respectively, views in cross section, in perspective, and on the side of the control valve assembly.
Figure 6:
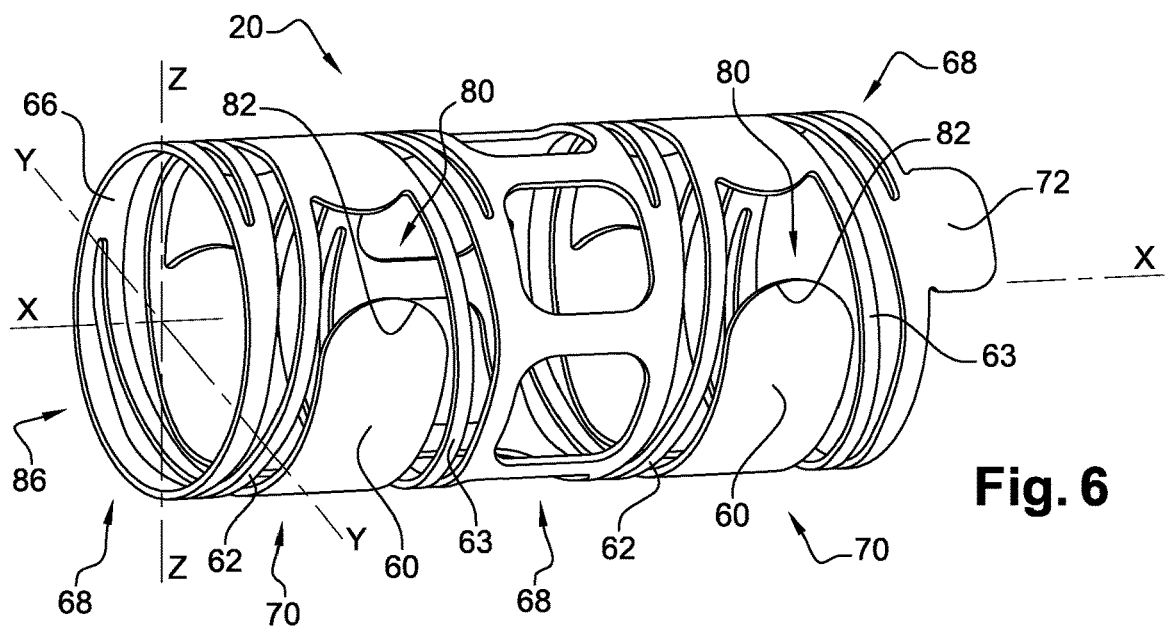
Figure 7:
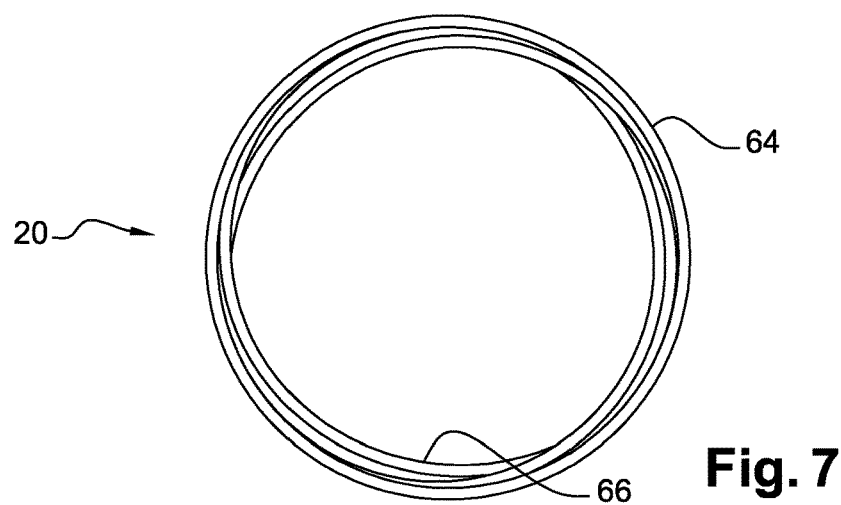

As described in FIGS. 5, 6 and 7, the control valves assembly 20 is tubular, which means to say that it is of cylindrical shape and is open at both ends 86. The oil can flow through the internal volume of the control valves assembly 20, the flow of oil flowing in the direction of the longitudinal and central axis X. The thickness of the tube of the control valves assembly 20 is very small in comparison with its diameter, namely of the order of 0.1% to 10%. The control valves assembly 20 comprises at least three rigid rings 68 and at least two valves 70. Each valve 70 comprises at least one blade 60 connected to two flexible arms 62, 63, and each valve 70 is connected to two consecutive rigid rings 68. The control valves assembly 20 comprises at least one angular indexing element 72 produced in the form of an internal or external notch. The angular indexing element 72 does not allow the control valves assembly 20 to rotate inside the slide valve body 30, as depicted in FIG. 4. The rigid rings 68 may comprise one or more openings of different shape to allow oil to circulate inside the control valves assembly 20. The blade 60 is elongate in the tangential direction of the tubular control valves assembly 20. The shape of the blade 60 defines an oblong shape that complements the oblong cross section of the recirculation opening 43 and of the supply opening 42 of the slide valve body, as depicted in FIG. 4. In addition, the blade 60 has a surface area that is larger than the surface area of the recirculation opening 43 and of the supply opening 42 of the slide valve body, as depicted in FIG. 4. The overlapping of the two surfaces makes it possible to create sealing against the oil that is required for the one-way valve function. The control valves assembly 20 comprises several valves 70 arranged in a circumferential direction perpendicular to the longitudinal axis X. In other alternatives, the control valves assembly 20 may comprise both valves 70 arranged circumferentially and valves 70 arranged linearly along the longitudinal axis X. In the circumferential direction, each pair of flexible arms 62, 63 extends toward the rear of the blade 60 with enough separation for the next blade in the circumferential direction to be positioned between the pairs of flexible arms 62, 63. Arranging the blades 60 in the one same circumferential direction makes it possible to increase the permeability/size ratio of the control valves assembly 20.

In the embodiment described hereinabove, the blades 60 and the arms 62, 63 are secured to one another. The control valves assembly 20 may be formed for example by cutting a cylindrical metal tube, for example one made of steel, using, for example, a laser. Other variants of the embodiment of the control valves assembly 20 described hereinabove are possible such as, for example, creating it from a sheet of metal then cutting out using stamping or a laser or chemical attack, and then rolling the metal sheet up and finally welding the sheet of metal that has been rolled.

In FIGS. 5, 6 and 7, each valve 70 is defined by the pair of spring arms 62, 63. The arms 62, 63 are also referred to as first arm 62 and second arm 63. According to FIGS. 5 and 6, the spring arms 62, 63 diverge in the direction away from the blade 60 of the valve 70. The first spring arm 62 extends to the left in FIGS. 5 and 6 toward one of the ends 86 while the second spring arm 63 extends to the right toward the second opening end 86 of the control valves assembly 20.

The spring arms 62, 63 are thin in terms of width. Because of the slenderness of the arms, an opening 80 of the blade is defined between the spring arms 62, 63 of the valve 70.

The tubular control valves assembly 20 described hereinabove could be incorporated into any other vehicle system requiring this type of valve for selectively blocking an opening in the manner described. Although the control screw 18 has been described in connection with the camshaft phaser 12 by way of an example of an application, it will be noted that the control screw 18 may be used for other applications.

A person skilled in the art will appreciate that the invention can be modified to adopt numerous variations without departing from the scope of the attached claims.

A brief description of the operation of the control valves assembly 20 will now be given. When the pressure exerted on the outside of the blade 60 is higher than that exerted on the inside of the blade 60, the force exerted on the surface has a tendency to deform the flexible arms 62, 63. The arms 62, 63 distort the blade 60, the blade 60 moves toward the central and longitudinal axis X, thereby uncovering the recirculation opening 43 and the supply opening 42 of the slide valve body 30. The deformation of the arms 62, 63 corresponds to their winding more tightly about the central and longitudinal axis X. The maximum deformation of the arms 62, 63 is limited by the radial end stops included in the slide valve insert 32.

The method for creating and assembling the aforementioned invention will be described below:

First of all, the method for assembling the control valves assembly 20 may be achieved in the following two different ways:

The first way of creating the control valves assembly 20 comprises the following steps:
 a) taking a metal tube,
 b) laser cutting the metal tube.

The second way of creating the control valves assembly 20 comprises the following steps:
 a1) taking a sheet of metal,
 b1) cutting the metal sheet by stamping,
 c1) rolling the metal sheet,
 d1) welding the sheet that has been rolled on the longitudinal axis X.

The method for assembling the control screw 18 comprises the following steps:
 a2) taking a control valve assembly 20, a slide valve insert 32, an O ring 34, a crinkle retaining ring 36, a screw body 22 and a spring 56, a retaining ring 74 and a filter 76,
 b2) inserting the O ring 34 into a groove of the slide valve insert 32,
 c2) inserting the control valve assembly 20 into the slide valve body 30 using a device that employs vacuum so as to guarantee the integrity of the control valve assembly 20 by keeping the blades 60 away from the axis X,
 d2) inserting the assembly consisting of the slide valve insert 32 and of the O ring 34 into the assembly consisting of the slide valve body 30 and of the control valve assembly 20,
 e2) inserting the crinkle retaining ring 36 into the groove of the slide valve body 30,
 f2) inserting the spring 56 into the screw body 22,
 g2) inserting the slide valve assembly 26 into the screw body 22 and inserting the retaining ring 74,
 h2) winding the filter 76 around the screw body 22,
 i2) fitting the filter clip 78 around the filter 76.

LIST OF REFERENCES USED 10 camshaft phaser assembly
11 control solenoid valve system
12 camshaft phaser
14 camshaft
18 control screw
20 control valves assembly
22 screw body
24 actuator
26 slide valve assembly
28 internal cavity
29 bore of the screw body
30 slide valve body
31 bore of the slide valve body
32 slide valve insert
34 O ring 36 crinkle retaining ring
38 advance opening
40 retard opening
42 supply opening
43 recirculation opening
44 locking opening
45 unlocking opening
46 internal chamber
48 advance port
50 retard port
52 supply port
54 locking port
56 spring
58 filter
60 blade
62 first arm
63 second arm
64 exterior surface
66 interior surface
68 rigid ring
70 valve
72 indexing element
74 retaining ring
76 filter
78 filter clip
80 opening
82 end of blade
86 end

The invention claimed is:

1. A method for assembling a control screw for a camshaft phaser of an internal combustion engine, the control screw comprising a screw body; a slide valve assembly within the screw body; and a control valve assembly arranged in the slide valve assembly, the control valve assembly comprising at least three rigid rings and at least two valves; wherein each of said at least two valves comprises at least one blade connected to two respective flexible arms, and each of said at least two valves is connected to two consecutive rigid rings of said at least three rigid rings, the method comprising the following steps:

taking the control valve assembly, a slide valve insert, a slide valve body, an O ring, a crinkle retaining ring, the screw body, a spring, a retaining ring, and a filter;

inserting the O ring into a groove of the slide valve insert;

inserting the control valve assembly into the slide valve body using a device that employs vacuum so as to guarantee integrity of the control valve assembly by keeping each of said at least one blade away from the axis inserting an assembly which includes the slide valve insert and the O ring into and assembly which includes the slide valve body and the control valve assembly;

inserting the crinkle retaining ring into a groove of the slide valve body;

inserting the spring into the screw body;

inserting the slide valve assembly into the screw body and inserting the retaining ring;

winding the filter around the screw body; and fitting a filter clip around the filter.

* * * * *